United States Patent
Asskaryar

[19]

[11] Patent Number: 5,978,975
[45] Date of Patent: Nov. 9, 1999

[54] TOILET TANK LID WITH STEREO SOUND SYSTEM

[76] Inventor: Farhad A. Asskaryar, 3834 Miramonte Pl., Alexandria, Va. 22309

[21] Appl. No.: 09/108,209

[22] Filed: Jul. 1, 1998

[51] Int. Cl.[6] .................................................. E03D 1/00
[52] U.S. Cl. .................................................. 4/353; 4/661
[58] Field of Search .............................. 4/353, 661, 363; D14/168; D23/313

[56] References Cited

U.S. PATENT DOCUMENTS

| | | | |
|---|---|---|---|
| D. 311,771 | 10/1990 | Smith | D23/313 |
| 4,319,367 | 3/1982 | Cantillo | 4/353 |
| 5,253,375 | 10/1993 | Prosper | 4/353 |
| 5,519,900 | 5/1996 | Gardner | 4/353 |

*Primary Examiner*—David J. Walczak
*Attorney, Agent, or Firm*—Liniak, Berenato, Longacre & White

[57] ABSTRACT

A unique sound system installed inside a toilet tank lid adapted to be used with any standard size toilet tank. This sound system which features AM & FM radio, a tape cassette player and/or a CD player. A loudspeaker system similar to any sound system available in the market helps to enhance the quality of sound. The entire system is designed to be water resistant in order to avoid electrical hazards. This audio system can be installed inside a ceramic, plastic, wood or metal cover for toilet water tank. This sound system is designed in such a way so that it can be installed in any toilet water tank available in the market. One only needs to replace the top (cover) of the conventional toilet water tank. The cover for the sound system which is identical to the cover for conventional toilet water tanks can be installed in any residential or commercial facilities. The toilet sound system can function with batteries or electrical outlet power. An radio antenna is directly connected to system for better sound quality. The sound system makes a lavatory stay or shower more fun and enjoyable.

20 Claims, 9 Drawing Sheets

Fig. 5
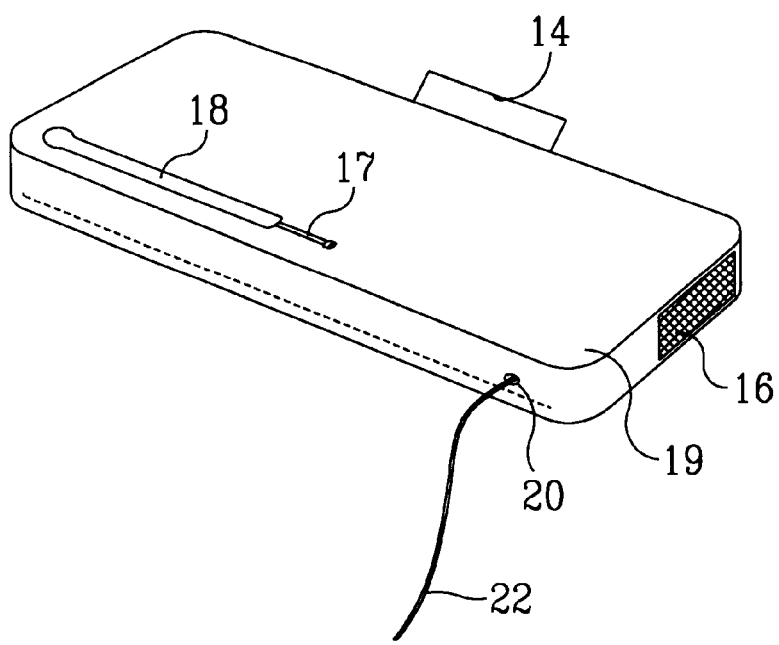
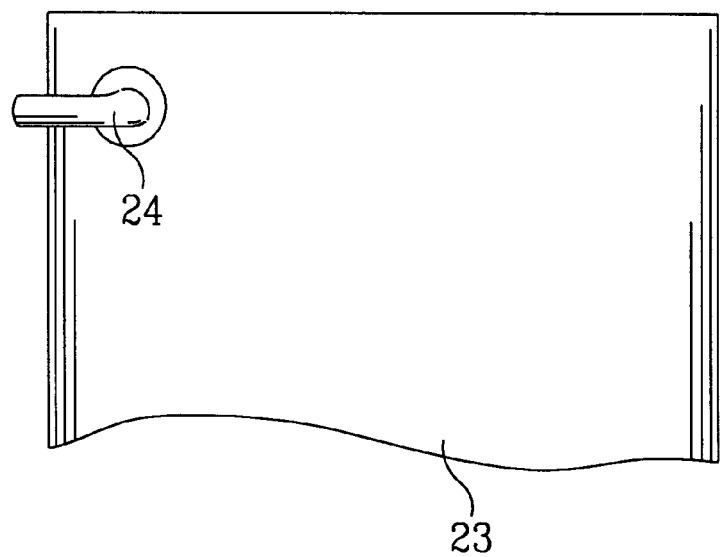
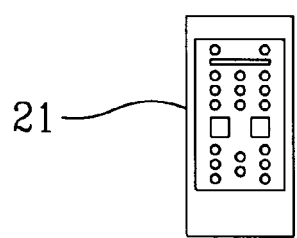

Fig. 12
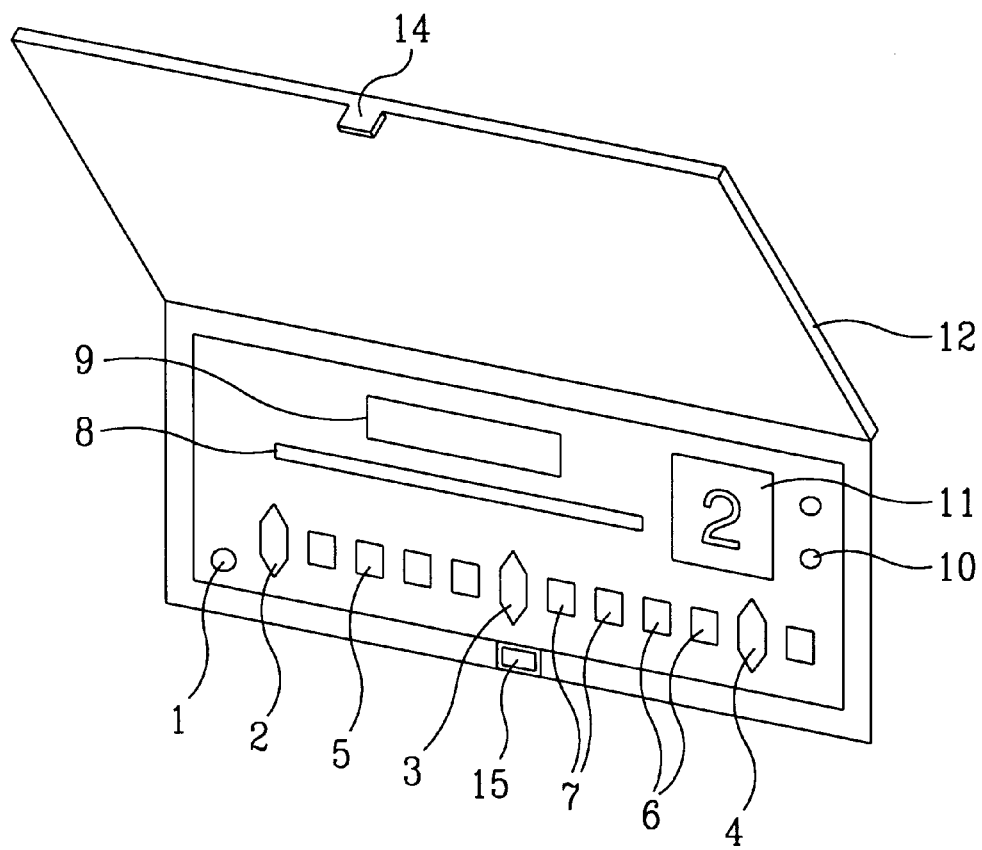
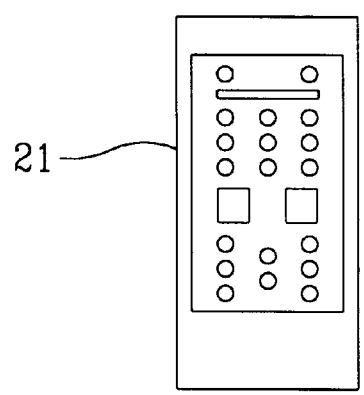

TOILET TANK LID WITH STEREO SOUND SYSTEM

BACKGROUND OF THE INVENTION

The invention relates to a restroom entertainment system and more particularly to a quality component stereo system installed in a toilet tank lid.

The purpose of this invention is to provide a unique quality sound system for entertainment in any restroom equipped with conventional toilet seat and a water tank attached to the toilet seat. Unlike many sound system inventions, for example refer to U.S. Pat. No. 4,521,919 to Molloy, U.S. Pat. No. 4,773,863 to Douglas, U.S. Pat. No. 5,253,375 Prosper, U.S. Pat. No. 5,465,422 to Dean, and U.S. Pat. 5,518,405 to Aiello, this stereo system does not only provide quality sound but it also proves to be safer and more sanitary than the prior art where the toilet seat is the main source of the sound (radio) system. This invention is a water-resistant sound system which has the components isolated from the user of the system to prevent exposure to electrical current. In addition, in contrast to the referred inventions, this unique invention is designed in such a way so it can feature a cassette recorder as well as CD player. The quality of sound is enhanced in this sound system because unlike the referred inventions it is equipped with bigger and more powerful loudspeakers capable of stereo sound quality. The sound system can be installed as a compact package which includes a TV, a radio, a cassette player, and a CD player, or the system can be itemized and have only one the 4 basic features.

An object of the invention is to provide a quality stereo sound system for entertainment within a toilet tank which is easily operated by a user.

Another object of the invention is to provide a safe and sanitary sound system which isolates a user from contact with the system components and prevents contact with electrical current.

A further object of the invention is to provide a user of the system with multiple system components to choose from.

It is another object of the invention to provide a superior stereo sound system than the prior art by equipping the system with larger and more powerful speakers.

SUMMARY OF THE INVENTION

This invention is a radio/stereo sound system, equipped with a tape cassette player and a CD player which is installed on the underside of the cover of the toilet water tank, or within the tank cover. This audio system can be installed inside a tank cover constructed of ceramic, plastic, wood, or metal and is designed to match any toilet water tank available in the market. One only needs to replace the top (cover) of the conventional toilet water tank. The system is waterproof and the system components are completely isolated from human contact. The system can be turned on and off by either a remote control or by simply turning on a power button feature on the front edge of the outer surface of the water tank. The sound system is also equipped with loudspeakers that are installed within the tank cover at the peripheral edges. A unique panel outside on the front edge of the water tank is designed with an On/Off power button, a volume adjuster, a high and low tone adjuster and a function button that allows one to switch from radio to tape, or to a CD player. In addition, there is an AM/FM band button, a tuning button for AM and FM waves, and a mode button for switching from mono to stereo sound system. As far as the tape cassette player is concerned, the control panel provides the basic feature such as Forward, Reverse, Pause and Stop/Eject buttons. The CD player control panel features the Up and Down button for Skip and Search of any particular song. In addition to the CD/Clock display button and display screen that indicates the Hour, Minute and Seconds, the CD control panel provide the buttons for Forward and Reverse buttons.

BRIEF DESCRIPTION OF THE DRAWINGS

The invention will be more fully understood from the following detailed description and appended claims when taken with the accompanying drawings, in which:

FIG. 5 is another view of the toilet tank and tank lid with the housing for a wiring system;

FIG. 12 is a view of the stereo system control panel, the cover for the stereo system, and the remote control for the system according to the invention;

DETAILED DESCRIPTION OF THE INVENTION

Figure 1:
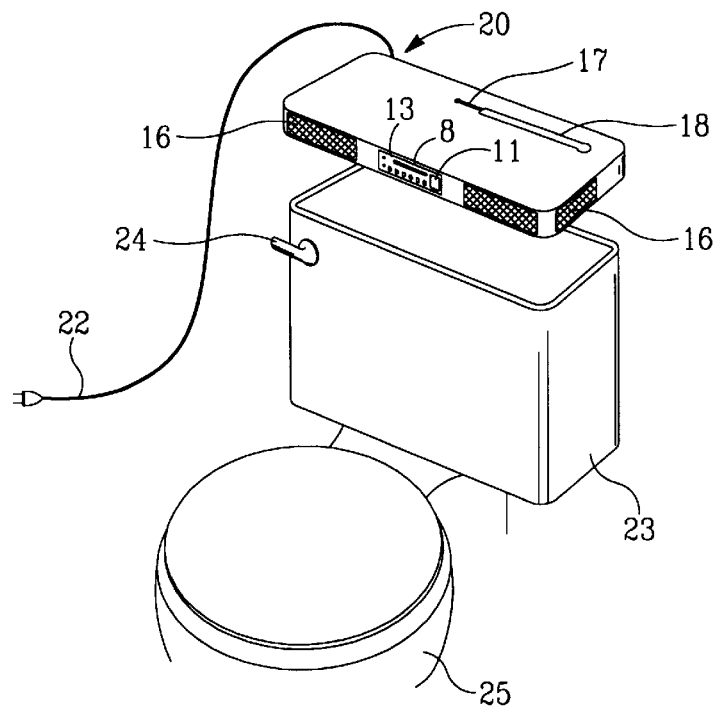
FIG. 1 is a side view of a toilet, toilet tank, and a water tank lid that depicts a front (anterior) picture of the sound system according to the invention.

Referring to FIGS. 1–3 and FIG. 5, the invention is shown as a self contained unit built into a toilet tank cover or lid 19, and which can be installed onto most standard size toilet tanks. A toilet 25 is shown having a tank 23 and flush handle 24, and a tank lid 19 according to the invention. The tank lid 19 is provided with a stereo unit 13 having a radio tuner 11, and a CD player 8 installed within the tank lid 19, a front panel of the stereo unit 13 allows for the radio 11 and CD player to be accessible from the front edge of the tank lid, as clearly shown. Dual speakers 16 are installed within the tank lid 19 on both sides of the stereo unit 13 to project stereo sound from the sound system. The speakers 16 can be facing the front edge of the tank lid, the side edges of the tank lid, or both the front and side edges of the tank lid 19 as depicted in the drawings. An antenna 17 is mounted at 18 onto the tank lid for improved radio reception and sound quality. The tank lid 19 is provided with a sealed opening 20 through which an electrical cord 22 to a plug passes to provide electrical current to the system components installed within the tank lid, as will be described hereinafter.

Figure 2:
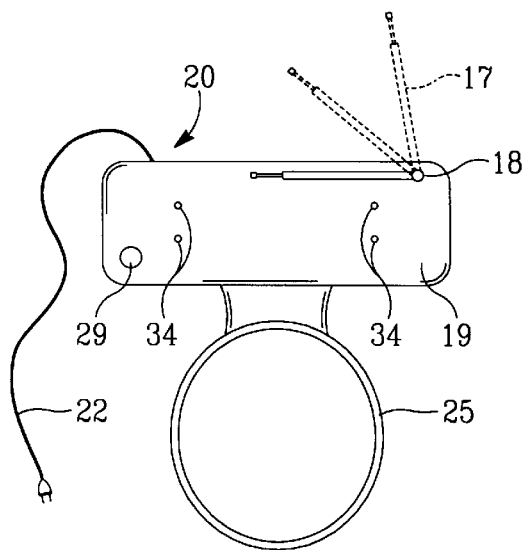
FIG. 2 is the top view of the toilet and toilet tank cover showing areas for installing the components according to the invention.

FIG. 2 illustrates several areas for optional component installation, as the invention provides for individualized systems. Mounting holes 34 are provided for auxiliary speakers which can be mounted to the top side of the tank lid 19. Also shown is a mounting area 29 for a television to be installed on top of the lid, if so desired.

Figure 3:
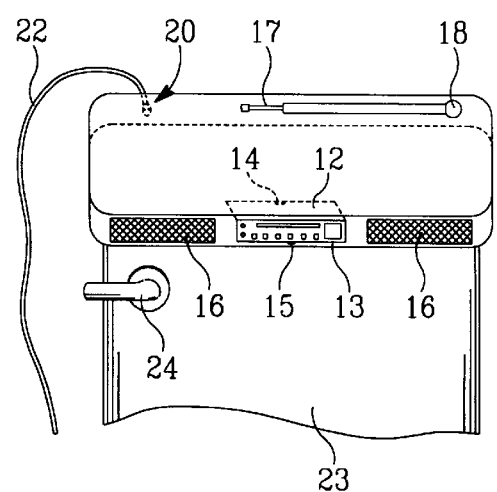
FIG. 3 is the front view of the toilet tank and the lid showing a front panel and other accessories of the invention.

FIG. 3 shows a waterproof transparent cover 12 for the front control panel of the stereo unit 13. The cover 12 is provided with a snap lock button 14 which cooperates with a mating part 15 on the front panel (Also seen in FIG. 12). The cover 12 is pivotable at a top edge of the tank lid 19 so as to flip upward to access the front panel and to pivot downward so as to completely cover the front panel thus protecting the panel buttons from water splashes. The cover 12 can be provided with a rubber type seal around its edges, or alternatively a sealing element can be provided around the peripheral edges of the front panel so that the cover 12 will better protect the front panel. Other types of covers can also be used to protect the front panel, and the invention is not limited to the exemplary cover described.

Figure 4:
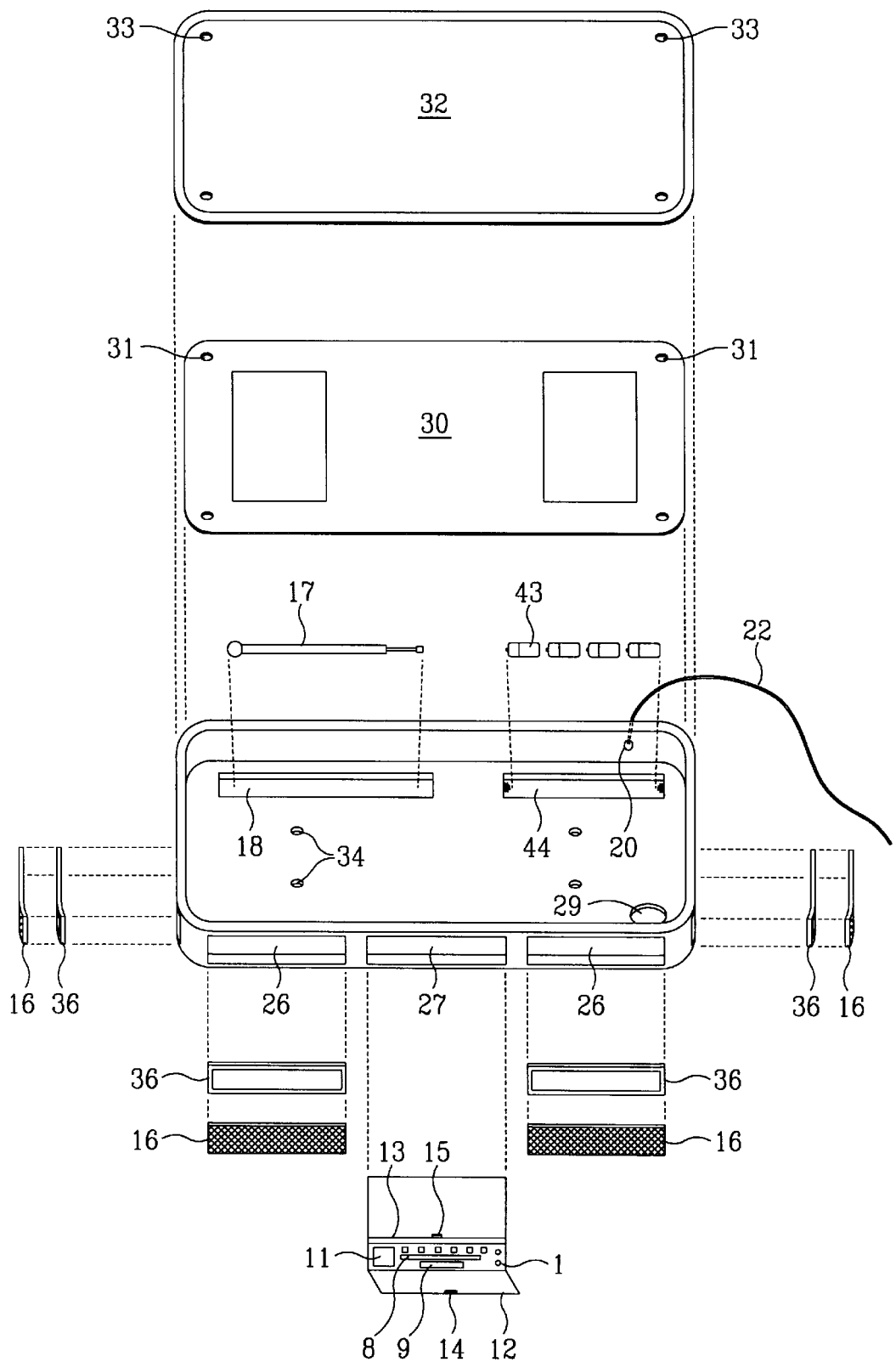
FIG. 4 is an inside view of the toilet tank lid laid "inside out" to show the housing for all of the components of the system according to the invention.

Now referring to FIGS. 4, 13 and 14, the installation of the system components within the toilet tank lid will be described. The underside of the tank lid 19 is depicted in FIG. 4 showing the mounting areas for the speakers 26, the stereo unit 13, the antenna 17, and batteries 43 which can be used to power the sound system instead of the electrical cord 22. A housing for the batteries 43 is shown at 44, as is a recessed cavity 18 for the antenna 17. Wiring 45 for battery power or electrical power to the stereo unit 13, and for antenna hook-up the radio provided in the stereo unit 13 is installed within the inside of the toilet tank lid 19. A waterproof gasket 30 is attached to the underside of the tank lid 19 at mounting holes 31 by suitable fastening means. The waterproof gasket 30 seals the interior compartment of the tank lid 19, protecting the components and wiring of the sound system from tank water. The crosshatched boxes shown on member 30 are indicative of the possible mounting configurations for control elements needed for the operation of radio/stereo sound system, as understood by those skilled in the art and as such require no further discussion. A bottom cover 32 is mounted to the tank lid under the waterproof gasket 30 at mounting holes by suitable fastening means, to hold the system inside the tank lid.

Figure 10:
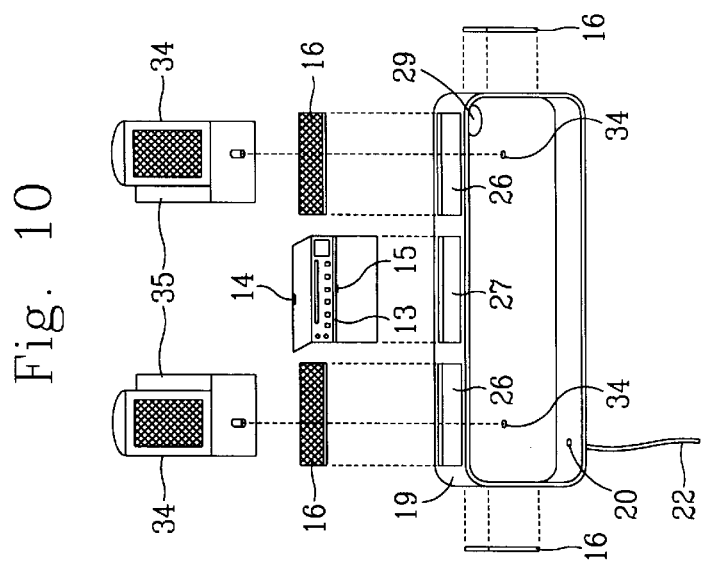
FIG. 10 is an inside view of the water tank lid of FIGS. 8 and 9 that depicts the housings for the speakers and stereo system.

FIG. 4 and FIG. 10 in particular show housing cavities 26 recessed within the tank lid 19 for supporting and enclosing the loudspeakers 16 mounted on the front and side edges of the tank lid 19. Four speakers 16 are shown in FIG. 10 as an alternative to the two shown in FIG. 4. The loudspeakers 16 are fitted into the housing cavities 26 such that the sound emitting surface of the speakers are flush with the peripheral edges of the tank lid. The entire speaker 16 is recessed within the housing cavity 26 so as to be protected within the tank lid 19 from potential damage. Mounting brackets 36 are fitted into the housing cavity which in turn have the speakers 16 fitted therein to hold the speakers within the cavities 26. The mounting cavities 26 allow for speaker wiring 45 to pass from the back side of speakers 16 to the inside compartment of the tank lid to the stereo components housed therein. Such wiring means to enable the sound to be transmitted from the radio, CD, and tape cassette components of the stereo unit from the inside housing compartment of the tank lid 19 to the speakers 16 are understood by those skilled in the art.

Figure 13:
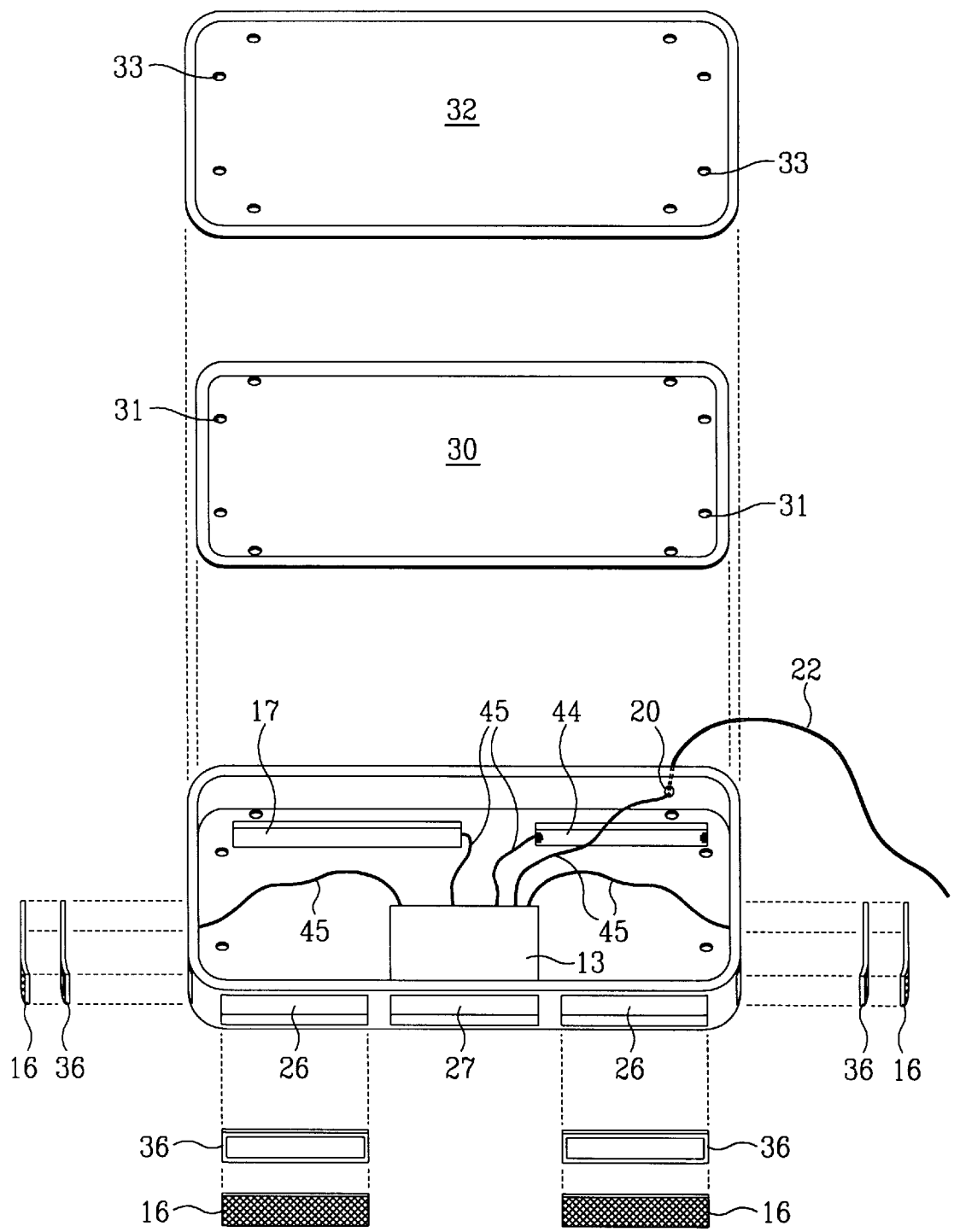
FIG. 13 is a view similar to FIG. 4 showing the connecting wires for the system components and the assembly arrangement for the cover pieces according to the invention.
Figure 14:
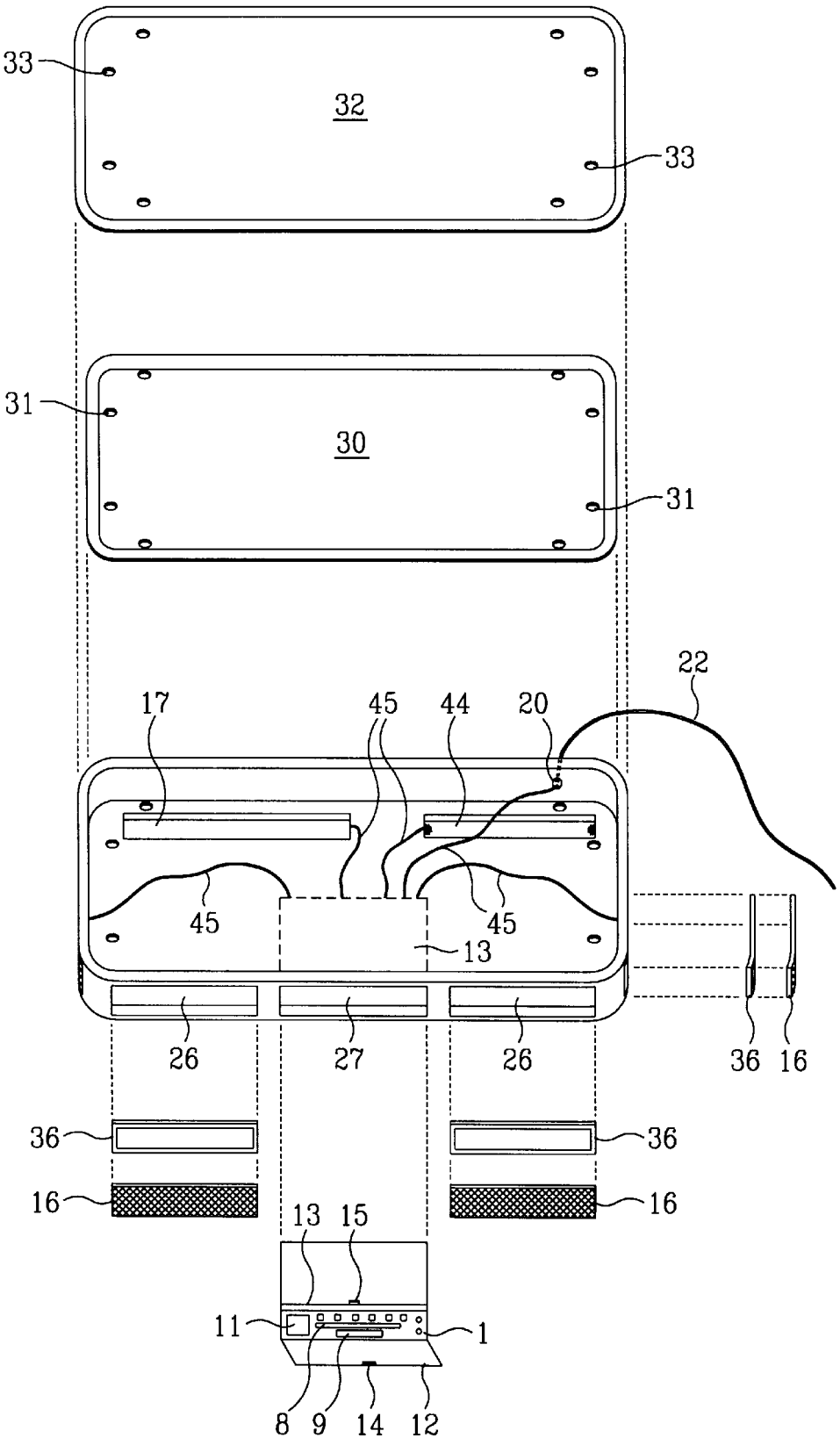
FIG. 14 shows additional details for the mounting means for the stereo speakers within the tank, and the component wiring for the system.

Also shown in more detail in FIGS. 4 and 10, 13 and 14 is a housing cavity 27 recessed within the tank lid 19 for supporting and enclosing the stereo unit 13 mounted in the front edge of the tank lid 19. The stereo unit 13 is fitted into the housing cavity 27 such that the control panel surface of the stereo unit is flush with the front edge of the tank lid. The entire stereo unit is recessed within the housing cavity 27 so as to be protected within the tank lid 19 from potential damage. The mounting cavity 27 allows for speaker wiring 45 such as shown in FIGS. 13 and 14 to pass from the back side of the stereo unit 13 through the inside compartment of the tank lid to the back side of the speaker 16, and to the auxiliary speakers if in use. Such wiring means to enable the sound to be transmitted from the radio, CD, and tape cassette components of the stereo unit 13 through the waterproof inside housing compartment of the tank lid 19 to the speakers 16 are understood by those skilled in the art.

Figure 6:
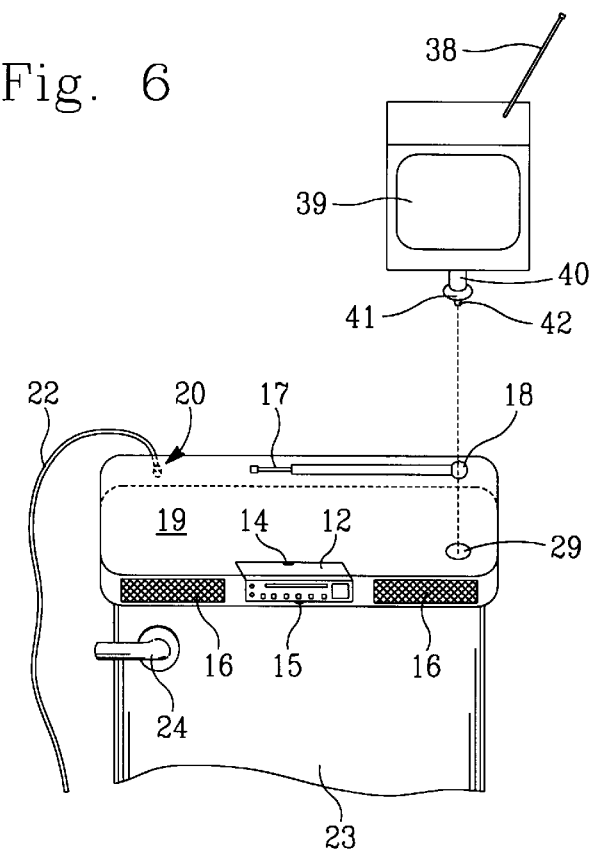
FIG. 6 is a front view of the toilet tank and the lid that shows the front panel and a housing for a television and other accessories according to the invention.
Figure 7:
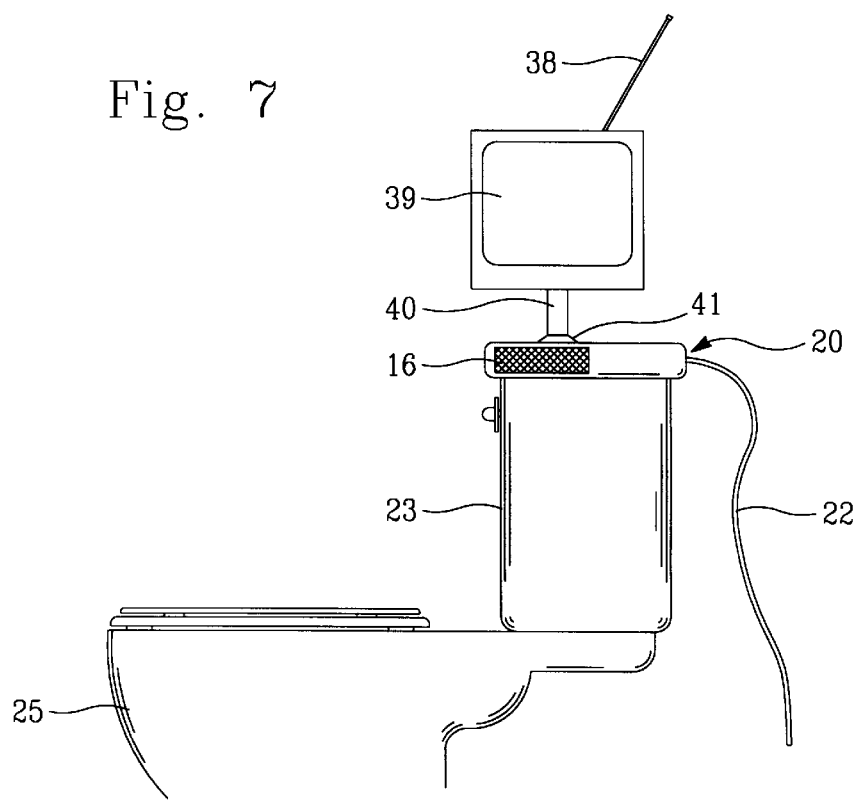
FIG. 7 is the side view of the toilet, toilet tank and a television installed on top of the water tank lid according to another embodiment of the invention.

Further details of the optional TV component are described with reference to FIGS. 6 and 7, where a TV 39 is mounted to the top side of the tank lid 19 at mounting boss 29. Any suitable means for stable mounting of the TV 39 to the tank lid 19 may be employed. The TV is provided with a stem 40 for supporting the TV and a socket 41 which allows for rotation of the TV relative to the tank lid 29. The TV has its own antenna 38 for TV reception.

The mounting boss 29 can be provided with an electrical connector or wiring to supply power to the TV 39 through a electrical terminal embedded within a mating part 42 in a base portion of a stem 40 of the TV 39. Such electrical connector or wiring means to enable the TV to be powered through the TV stem 40 via mating part 42 and mounting boss 29 to the power cord 22 will be understood by those skilled in the art and require no further explanation, as various embodiments for such means can be employed without departing from the invention.

Figure 8:
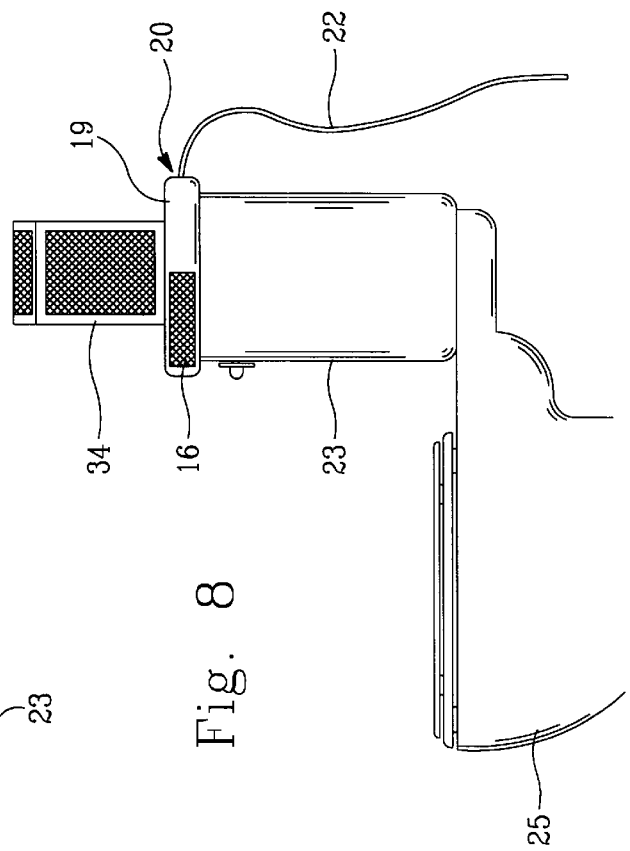
FIG. 8 is the side view of the toilet, toilet tank and the speakers installed on the sides, and auxiliary speakers on the top of the tank lid according to an alternate embodiment of the invention.
Figure 9:
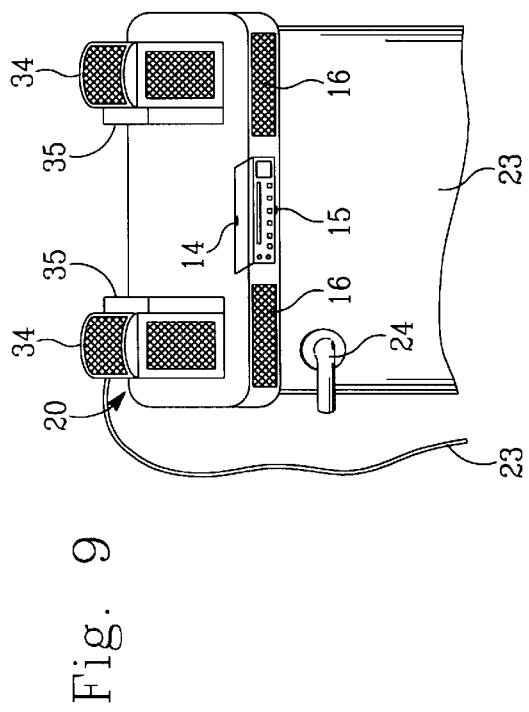
FIG. 9 is a partial front view of FIG. 8 showing the speakers and a housing for the accessories to be installed on the water tank lid according to the invention.

Further details of the optional auxiliary speaker component are described with reference to FIGS. 8–10, where two auxiliary speakers are mounted to the top side of the tank lid 19 at mounting holes 34. Any suitable means for stable mounting of the speakers 34 to the tank lid 19 may be employed. The mounting holes 29 allow for speaker wiring 45 (FIGS. 13 and 14) to pass from the auxiliary speakers 34 through the tank lid to the inside of the tank lid to the stereo components housed therein. Such wiring means to enable the sound to be transmitted from the radio, CD, and tape cassette components of the stereo unit from the inside mousing compartment of the tank lid 19 to the auxiliary speakers 34 via mounting holes 34 will be understood by those skilled in the art and require no further explanation, as various embodiments for such means can be employed without departing from the invention. The auxiliary loudspeakers 34 are provided with an attached compartment 35 for holding accessories, tape cassettes, batteries, etc. The auxiliary loudspeakers provide additional stereo sound if so desired by a user.

Figure 11:
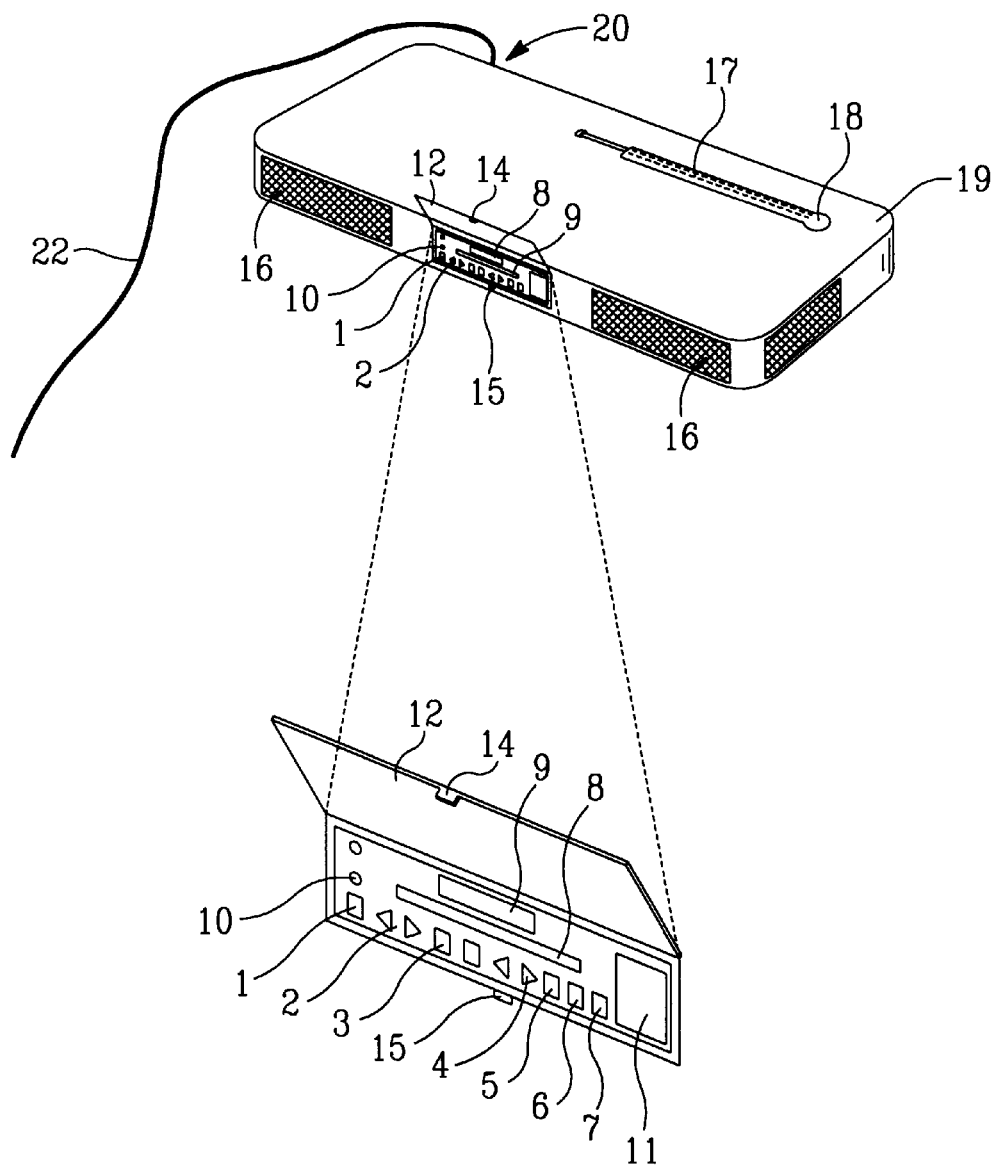
FIG. 11 is a top view of water tank lid showing the stereo panel, the speakers, and the stereo system antenna.

Referring now to FIGS. 11 and 12, the front control panel for the stereo sound system and the control functions featured on the panel will be described. The panel displayed on the outside front edge of the water tank cover 19 is designed with an On/Off power button 1, a volume adjuster button 2, a high and low tone adjuster button 3 and a function button 4 that allows one to switch from radio to tape, or to a CD player. In addition, there is an AM/FM band button 6, tuning buttons 7 for AM and FM waves, and a mode button 5 for switching from mono to stereo sound system.

As far as the tape cassette player is concerned, a cassette deck 9 is provided on the control panel and basic controls such as Forward, Reverse, Pause and Stop/Eject buttons (not shown) for the cassette player are provided. The CD player of the stereo unit has a CD loading deck 8 on the control panel and features such as Up and Down button (not shown) for Skip and Search of any particular song are provided as typical to a CD player. Additionally a Clock Set control 10 is provided and a display screen 11 indicates the Hour, Minute and Seconds.

FIGS. 5 and 12 illustrate a remote control 21 for the stereo sound system which is used in the typical manner of such remote control devices to remotely control the system functions such as on/off, volume control, radio tuning for AM/FM, and CD and tape cassette player functions.

While the invention has been described with references to various embodiments, the description is illustrative and is not to be construed as limiting the scope of the invention. Various modifications and changes may occur to those skilled in the art without departing from the spirit and scope of the invention as defined by the appended claims.

I claim:

1. A combination toilet tank lid and audio sound system contained within said toilet tank lid sized to fit on a tank of a toilet, said tank of said toilet defining a substantially rectangular, hollow body holding adapted to hold water and a flushing mechanism to flush said toilet, said combination comprising:

a stereo unit having at least one component for transmitting audible sounds;

speaker means for emitting sound from the stereo unit;

control means for controlling the stereo unit and the speaker means;

power means for providing power to said stereo unit, speaker means and control means; and housing means for housing the stereo unit and at least one of the speaker means, the control means and the power means, wherein the housing means is disposed within said toilet tank lid and said toilet tank lid comprises a rectangular, plate-shape cover member sized adapted to engage an edge defining a substantially rectangular opening of said tank.

2. The system according to claim 1, wherein the housing means includes housing cavities for the stereo unit and for the speaker means, and a water-resistant member surrounding at least a portion of the housing cavities to protect said stereo unit and said speaker means from water in the toilet tank.

3. The system according to claim 1, wherein the control means is a front panel on the stereo unit provided with system function control buttons, which a user can access to control various system functions.

4. The system according to claim 3, wherein the system functions include a volume adjuster, an on/off button, and a radio channel tuner.

5. The system according to claim 3, further comprising a water-resistant cover attached to the front panel, said water-resistant cover capable of covering said front panel when not in use to protect said control means from water damage, and uncovering said front panel to allow access by a user.

6. The system according to claim 1, wherein said at least one component includes a radio.

7. The system according to claim 6, further comprising an antenna connected to the radio.

8. The system according to claim 1, wherein said at least one component includes a CD player.

9. The system according to claim 1, wherein said at least one component includes a cassette tape player.

10. The system according to claim 1, wherein said speaker means includes two speakers mounted within said housing means in a spaced relationship to provide stereo sound.

11. The system according to claim 1, wherein said power means includes an electrical power cord.

12. The system according to claim 1, wherein said power means includes batteries.

13. The system according to claim 1, further comprising auxiliary speaker means attached to said housing means.

14. The system according to claim 1, further comprising a television attached to said housing means.

15. The system according to claim 1, wherein the control means is a remote control unit provided with system function control buttons, which a user can use remotely to control various system functions.

16. The system according to claim 15, wherein the system functions include a volume adjuster, an on/off button, and a radio channel tuner.

17. A combination toilet tank lid and audio sound system comtained within said toilet tank lid sized to fit on a tank of a toilet, said tank of said toilet defining a substantially rectangular, hollow body holding adapted to hold water and a flushing mechanism to flush said toilet, said combination comprising:

a stereo having at least component for delivering a signal to a speaker fro transmitting audible sounds;

control means for controlling the stereo unit and the signal delivered to the speaker;

a power supply for providing power to said stereo unit, speaker and control means; and a toilet tank lid for both enclosing a toilet tank and housing at least one of the stereo unit, the speaker, the control means and the power supply, wherein said toilet tank lid comprises a rectangular, plate-shape cover member sized to engage a top edge of said tank, said top edge defining a substantially rectangular opening of said toilet said.

18. the combination of claim 17, wherein sdaid stereo unit is disposed in at least one recess provided along a peripheral edge of said rectangular, plate-shaped cover member.

19. The combination of claim 17, wherein said stereo unit is removably disposed within at least one recess provided along an underside of said toilet tank lid in a direction facing water in said toilet tank when said toilet tank lid is placed on said toilet tank.

20. The combination of claim 17, further comprising a waterproof transparent cover overlying a front control panel of at least one of said stereo unit and control means.

* * * * *